July 5, 1932.   J. G. CONNOR   1,865,837
MECHANICAL FIGURE
Filed Jan. 27, 1931   6 Sheets-Sheet 1

INVENTOR,
James G. Connor.
BY Hovey & Hamilton,
ATTORNEYS.

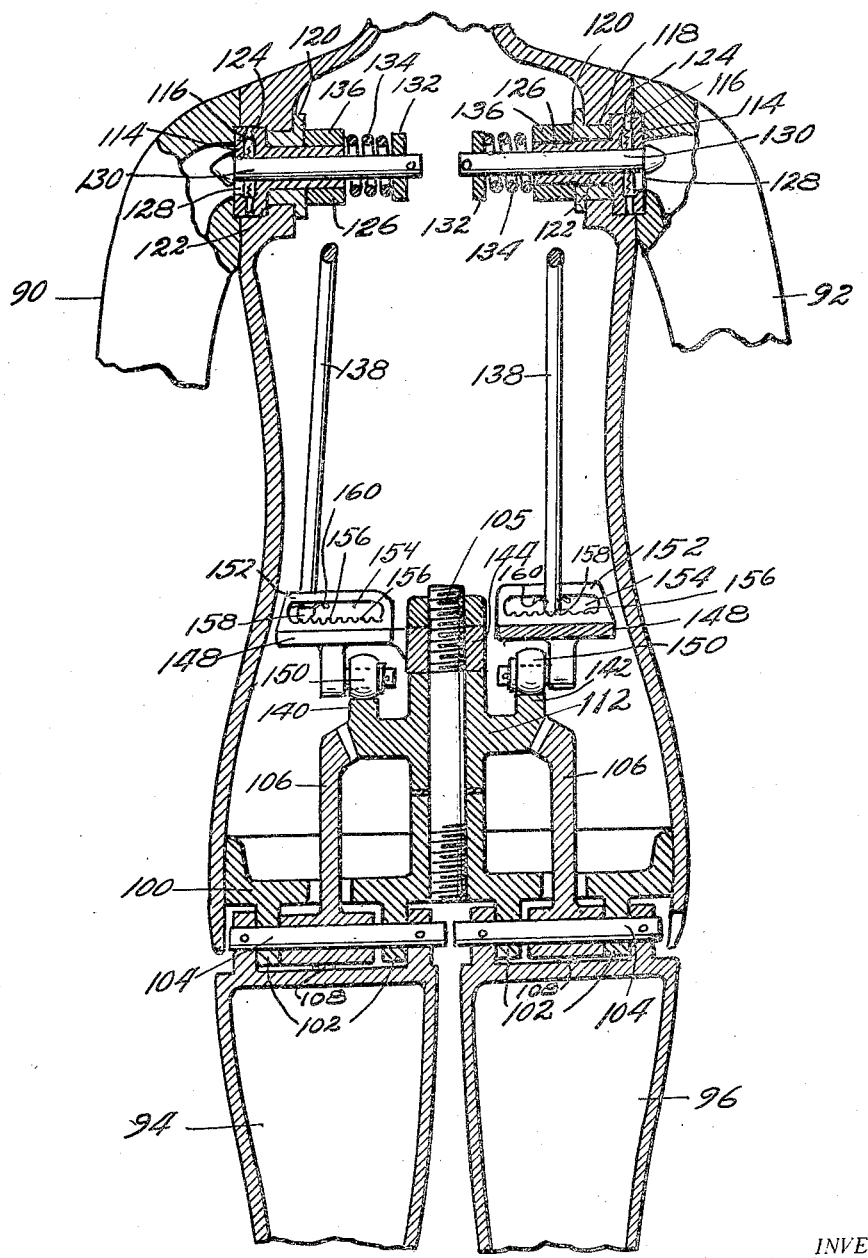

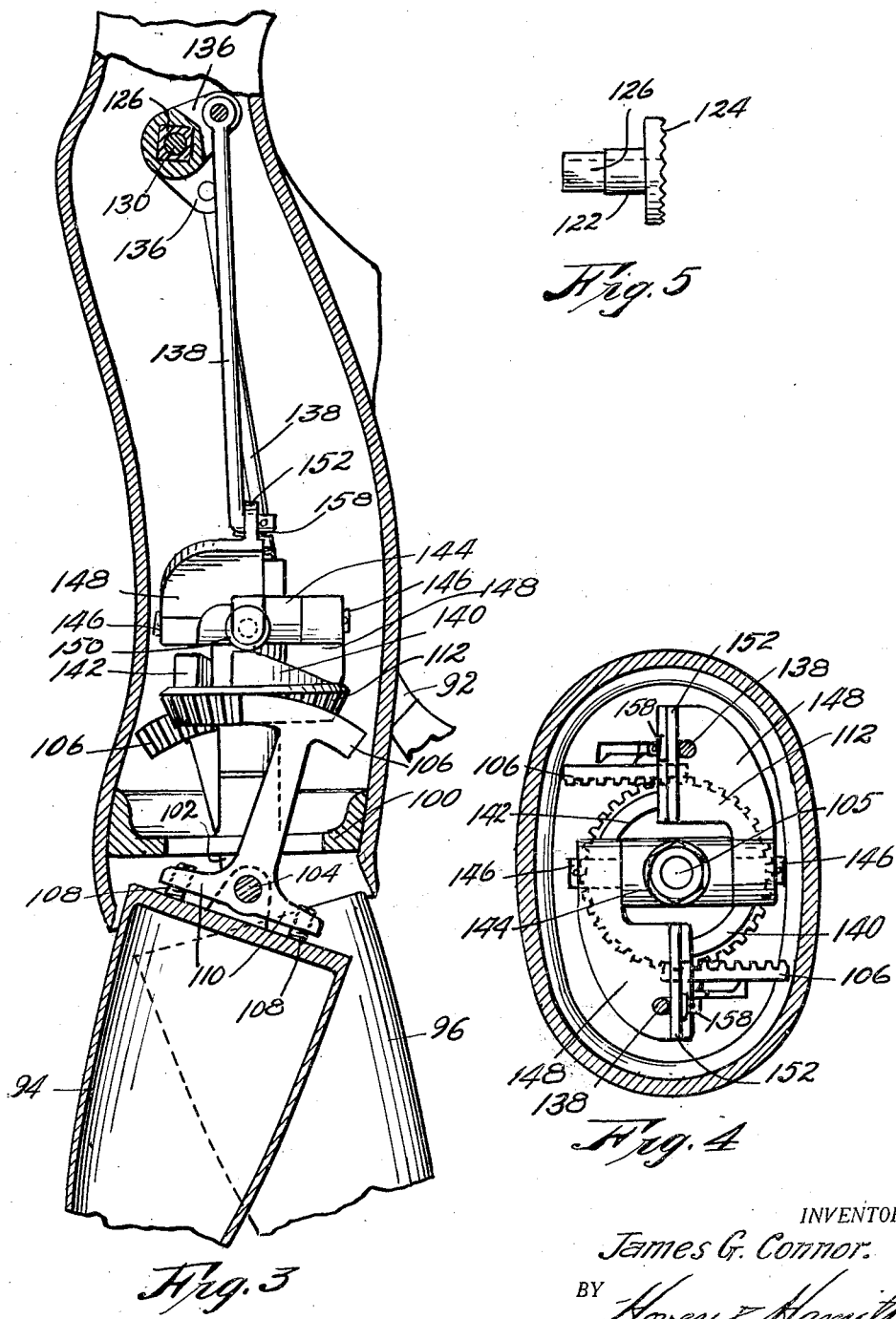

July 5, 1932.   J. G. CONNOR   1,865,837
MECHANICAL FIGURE
Filed Jan. 27, 1931   6 Sheets-Sheet 4

INVENTOR,
James G. Connor.
BY
Hovey & Hamilton,
ATTORNEYS.

July 5, 1932.  J. G. CONNOR  1,865,837
MECHANICAL FIGURE
Filed Jan. 27, 1931   6 Sheets-Sheet 5

INVENTOR,
James G. Connor.
BY Hovey & Hamilton,
ATTORNEYS.

July 5, 1932.  J. G. CONNOR  1,865,837
MECHANICAL FIGURE
Filed Jan. 27, 1931   6 Sheets-Sheet 6
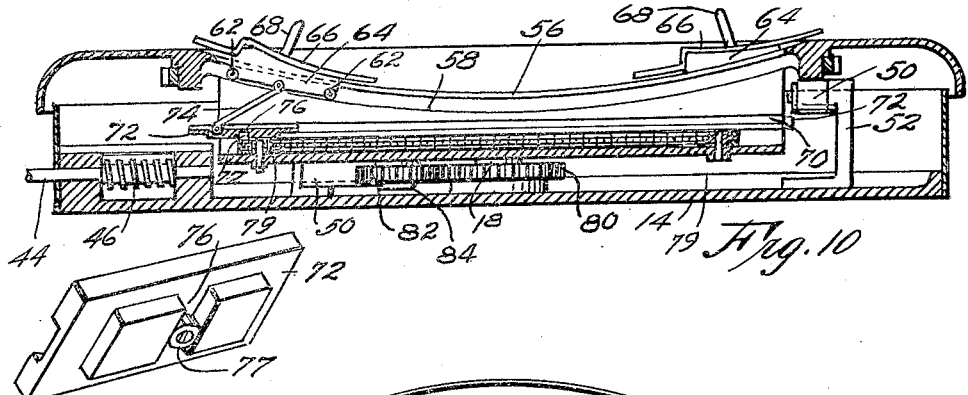
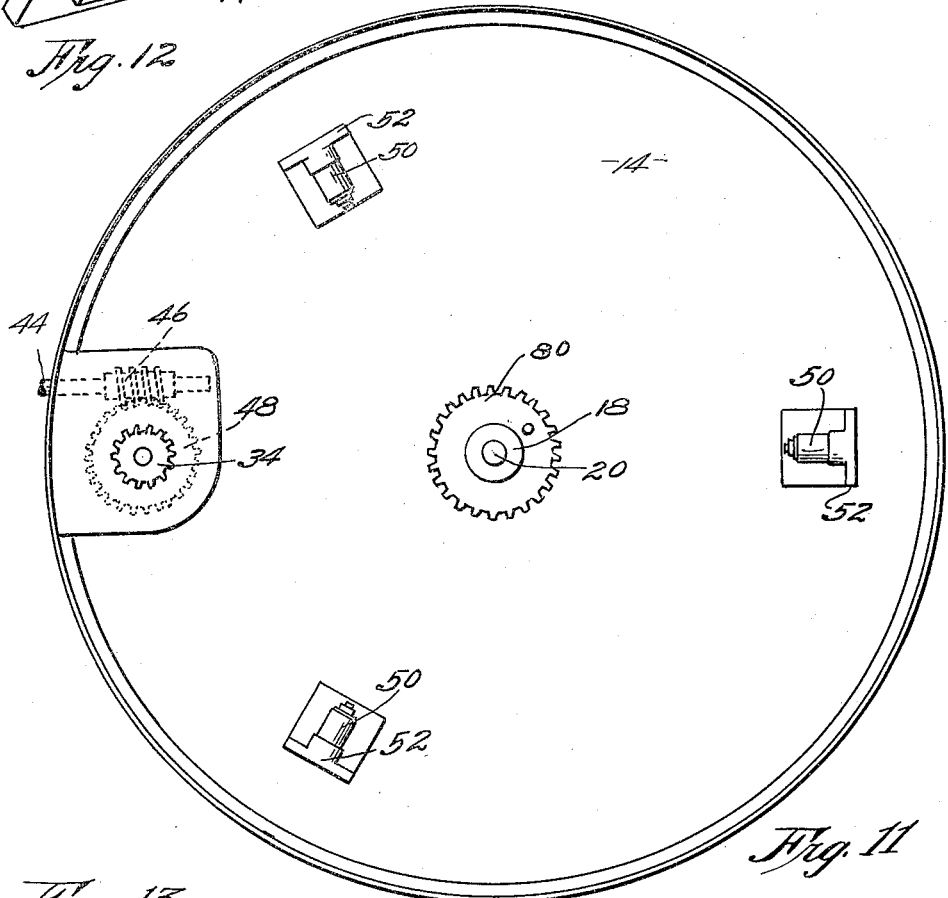
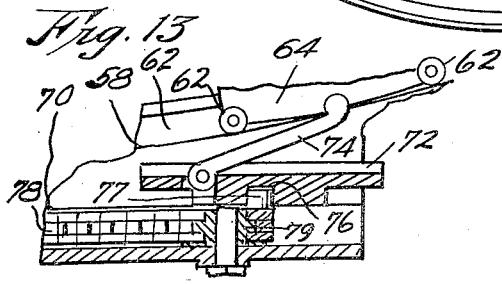
INVENTOR,
James G. Connor.
BY Hovey & Hamilton
ATTORNEYS.

Patented July 5, 1932

1,865,837

UNITED STATES PATENT OFFICE

JAMES G. CONNOR, OF KANSAS CITY, KANSAS, ASSIGNOR TO THE ANIMATED ROBOQUIN DISPLAY COMPANY, A CORPORATION OF MISSOURI

MECHANICAL FIGURE

Application filed January 27, 1931. Serial No. 511,619.

This invention relates to mechanical figures and particularly to mechanical figures suitable for display purposes and designed to be located in show windows or any other suitable place to display wearing apparel.

The principal object of this invention is the provision of a mechanical figure, the members of which are movable to represent in a large degree the natural movements of the human body, or of any other animal they may represent.

A further object of this invention is to provide a mechanical figure which rotates as its members are being moved relative to each other.

A still further object of the present invention is the provision of means to maintain the torso of the figure in a vertical position as the legs, which support the same, are oscillated in opposite directions.

Another object of this invention is the provision of a mechanical figure having arms movable by means actuated by the legs when the legs are oscillated.

Further objects of the present invention are the production of a mechanical figure which is easily operated, easily adjusted to vary the degree of relative movement of the different parts, and will not readily get out of order.

Other objects will appear during the course of the specification, referring to the accompanying drawings in which:

Fig. 2 is a fragmentary front elevation with parts broken away to disclose parts of the operating mechanism.

Fig. 3 is a fragmentary side elevation partly broken away to show the operating parts.

Fig. 4 is a horizontal sectional view of the torso showing operating parts.

Fig. 5 is a detailed view of the hollow trunnion.

Fig. 10 is an irregular sectional view taken on line X—X of Fig. 6.

Fig. 11 is a plan view of the turntable base.

Fig. 12 is an enlarged perspective view of the slide block.

Fig. 13 is an enlarged sectional view taken on line XIII—XIII of Fig. 6.

Figure 1:
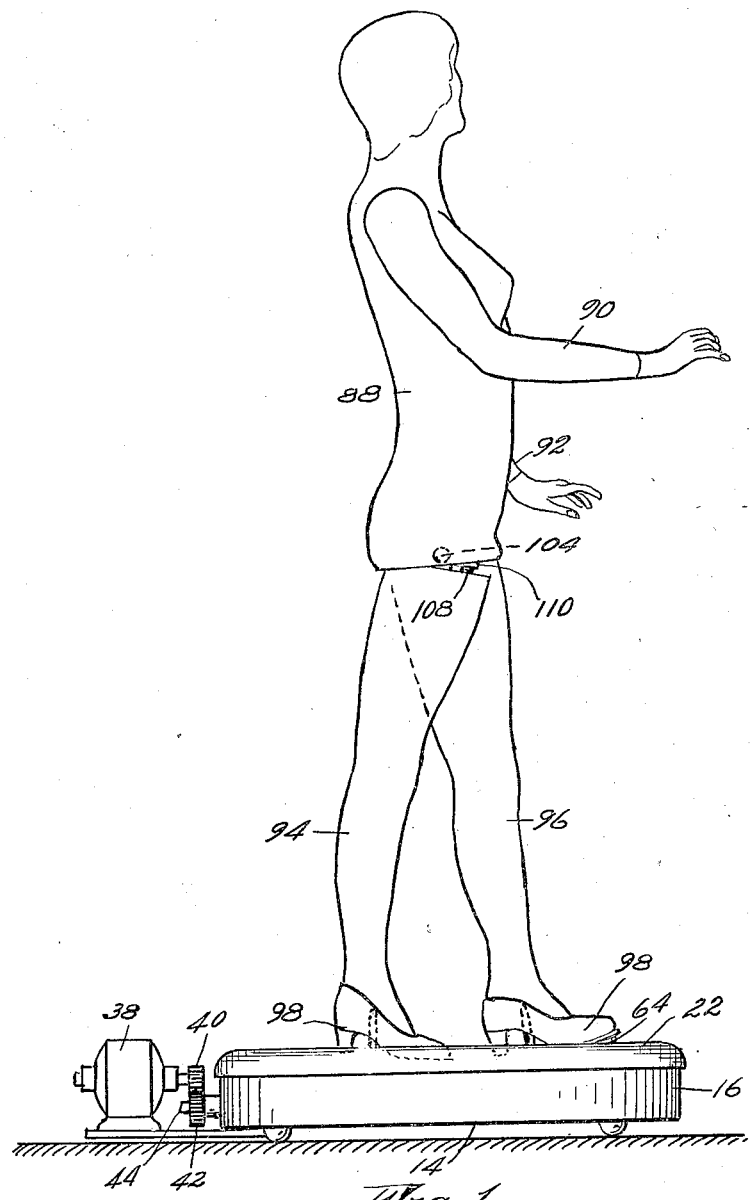
Figure 1 is a side elevation of a mechanical figure embodying the present invention.
Figure 6:
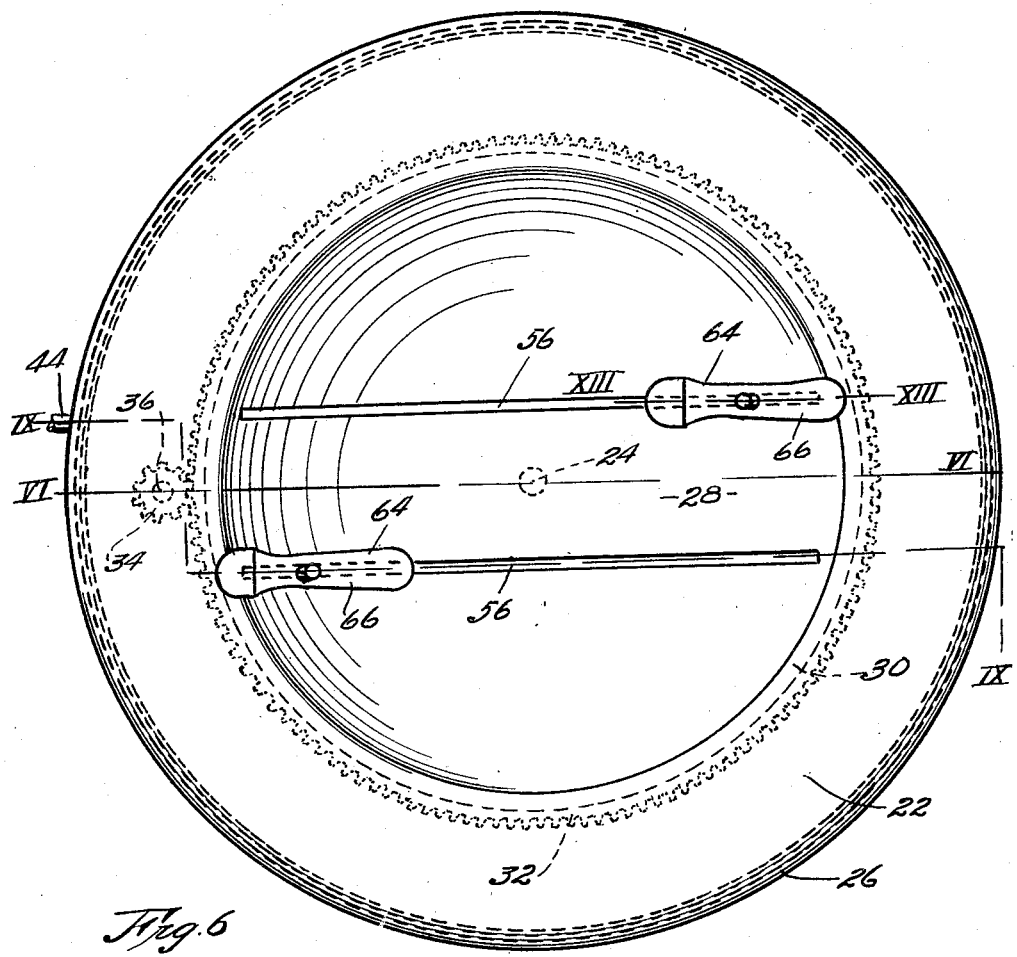
Fig. 6 is a plan view of the turntable.
Figure 7:
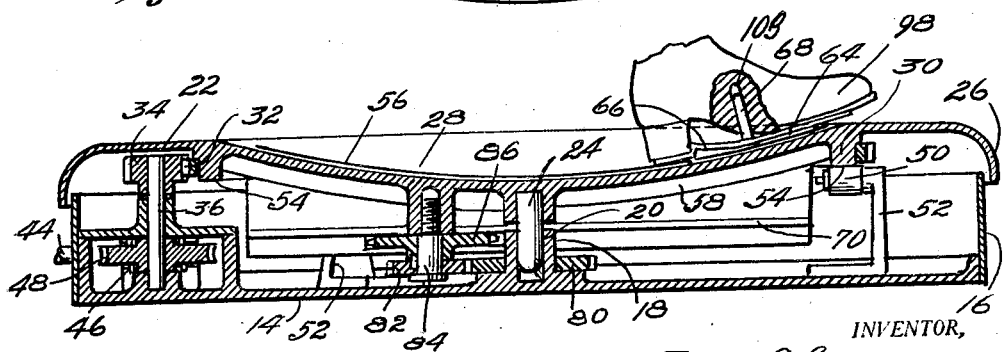
Fig. 7 is a vertical sectional view of the turntable with a part of the figure shown in position thereon.
Figure 8:
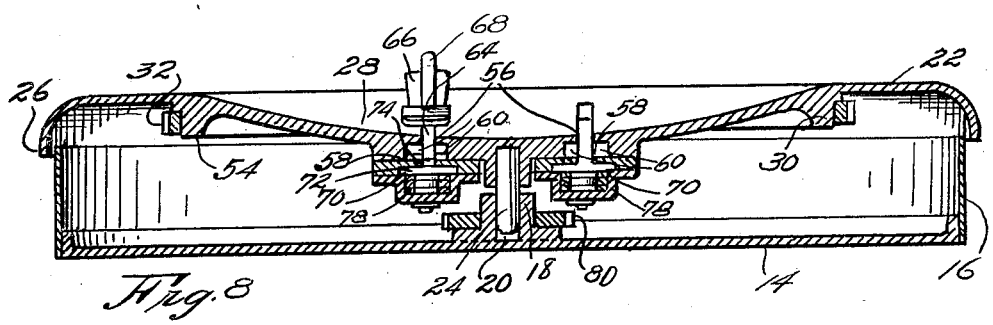
Fig. 8 is a vertical section taken on line VIII—VIII of Fig. 6.
Figure 9:
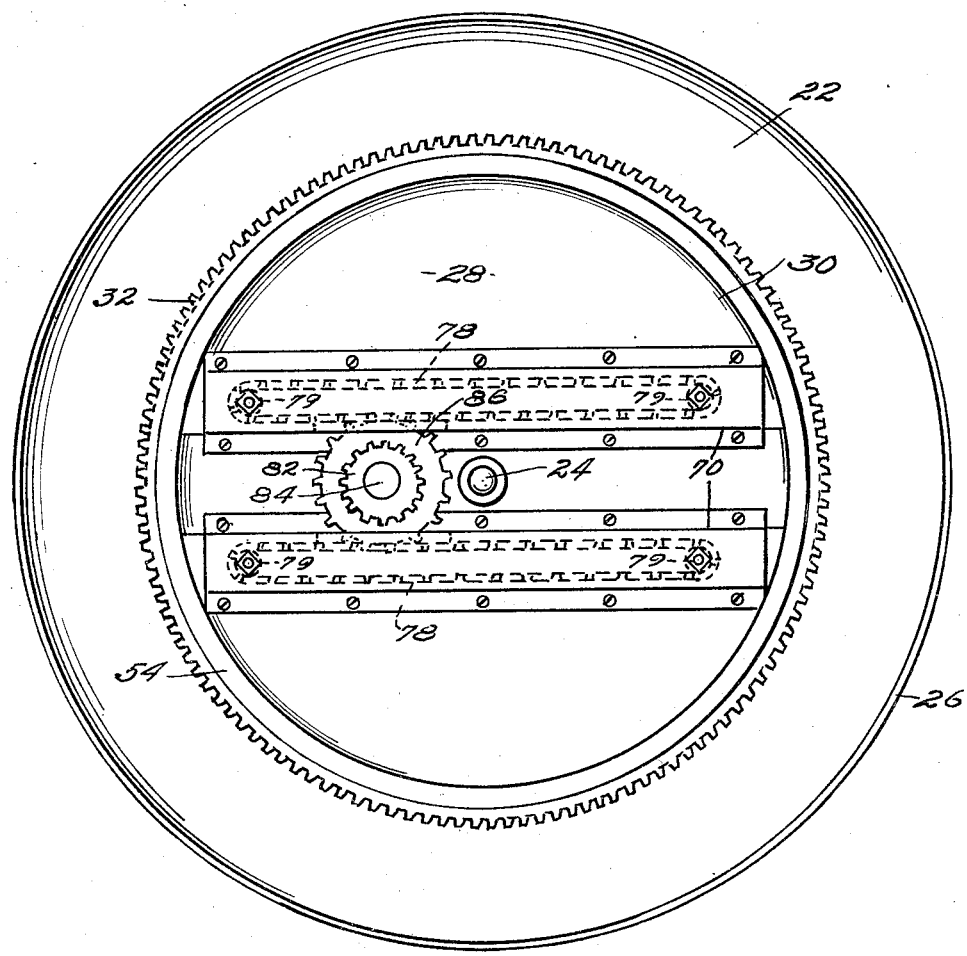
Fig. 9 is an inverted plan view of the top member of the turntable.

In the drawings like reference characters refer to similar parts and the numeral 14 designates the base of a turntable, having an upwardly extending peripheral flange member 16 securely attached thereto and a centrally located boss 18 having an axially disposed socket 20 formed therein. The aforementioned parts may be cast in one unit or built up of separate parts.

Positioned above base 14 and adapted to rotate thereon is a turntable 22 having a downwardly extended, axially disposed pin 24 which extends into the socket 20 to maintain the turntable and base in proper rotatable relation. A flange 26, integral with turntable 22, extends downwardly over the flange 16 of base 14 to conceal the working parts and present a pleasing appearance.

The central portion of turntable 22 is concave at 28 to produce a saucer shape for reasons hereinafter set forth. An annular flange 30, integral with and concentric to the axis of rotation of the turntable 22 serves to support a ring gear 32.

Pinion 34 rigidly mounted on shaft 36 meshes with ring gear 32 and when rotated through the intermediacy of motor 38, gear 40, gear 42, shaft 44, worm 46 and worm gear 48, causes the turntable to rotate at the desired rate of speed. It is apparent that there are many well known types of driving means, such as belts, chains, friction wheels, etc., which might be substituted for the particular drive shown and described. To properly support the turntable in a horizontal position, during rotation, rollers 50 which are mounted on brackets 52, carried by base 14, contact the lower horizontal surface 54 of annular flange 30.

It is desirable to provide reciprocating carriages to which the feet of the figure are secured to cause oscillation of the feet and legs of the figure in opposite directions, to represent to a certain degree of accuracy a walking action. Furthermore, the movement of the legs must be such that the torso is held against any appreciable vertical movement. To produce this result the following construction is provided. Two arcuate slots 56 are formed in the concave surface 28 of the turntable, and are preferably, in spaced apart parallel relation, however they may be in angled relation without any material change in the mechanism hereinafter described. Positioned below and in alignment with each of the slots is an arcuate guide or track 58 which conforms to the curvature of the surface of the turntable 22 and is provided with oppositely disposed channels 60 into which rollers 62 of carriages 64 are inserted to rest on guide 58. Carriages 64 may be provided with foot rests 66 which are positioned above the surface of the turntable and have radially extending pins 68 which serve to engage the figure as hereinafter set forth. Any other form of figure engaging means such as clamps may be substituted for pins 68.

Positioned below each of the guides 58 is a horizontally disposed track 70 in which is a slidably mounted slide block 72 connected to its corresponding carriage 64 by means of a pivoted connecting rod 74 which is of sufficient length to permit the carriage to travel in an arcuate track while the slide block travels in a horizontal path without interfering with the operation.

As clearly shown in Figs. 10 and 12, block 72 is provided at its underside with a transverse slot 76 in which a roller 77, carried by the endless chain 78, is positioned so that as the chain is continually driven about roller guides 79, by means hereinafter described, the slide block will be reciprocated in the track 70 and the carriage will be moved back and forth in its arcuate guide, thereby oscillating parts carried thereby.

To operate chain 78, a spur gear 80 is rigidly attached against rotation to base 14 concentrically with the axis of rotation of turntable 22. This gear meshes with a spur gear 82 rotatably mounted on axis 84 and carried by the turntable 22. Mounted on axis 84 and rigidly secured to gear 82 is a sprocket wheel 86 which is so positioned as to operatively engage both of the endless chains 78 to drive them in opposite directions. When the turntable is rotated the gear 82 will revolve about gear 80, thereby causing gear 82 to rotate on its axis and drive sprocket wheel 86 and causing the chains to operate. To vary the relative speed of rotation of the turntable and oscillation of the carriages it is only necessary to change the gears 80 and 82 to gears of different ratios.

Should it seem desirable, the slide block 72 and cooperating parts may be eliminated and the carriage be driven direct from the chain 78 by making slight changes in the construction.

The figure shown is that of a woman and consists in the main of a torso 88, arms 90 and 92 and legs 94 and 96 terminating in feet 98.

The lower portion of torso 88 is provided with a plate 100 having two pairs of depending lugs 102, each pair being adapted to carry a pin 104 upon which one of the legs is pivotally mounted for oscillation. These pins are shown in axial alignment, but may be in offset relation or in angled relation when desired.

In the lower portion of each leg and extending through the foot portion is formed a recess 103, into which is snugly fitted pin 68 to secure each leg to its respective carriage. It will be apparent that to obtain the proper relation of the parts of this device during the walking motions, it is necessary that the radial center of the arcuate guide should be approximately the center of pins 104. This construction will maintain the torso in a fixed vertical position and should it be desired to obtain a vertical movement of the body, this radial center of the guides may be changed.

A segmental bevel gear 106 is mounted on each of the pins 104 respectively and maintained in a fixed position relative to its adjacent leg by means of adjusting screws 108 which are operatively mounted in oppositely disposed arms 110 integral with gear 106, and are adapted to rest against the upper portion of the leg on opposite sides of the pin 104 so that by adjusting the screws the relative positions of the segmental gear and the axis of the leg may be varied.

On a vertically disposed shaft 105, carried and extending upwardly from plate 100, is a rotatably mounted bevel gear 112, positioned between and in operative engagement with segmental gears 106, which is adapted to be oscillated as the legs are reciprocated.

The gear construction just described operates to maintain the torso in the proper vertical position in the following manner. Referring to Fig. 2, it will be observed that pin 105 is secured in a fixed position relative to the torso, that the gear 112 has a long hub rotatably mounted on the pin, and also that the segmental gears 106 engage diametrically opposite sides of gear 112, thus securing gear 112 in a substantially fixed axial position, and that as the gears 106 oscillate no material change will be caused in the axial position of gear 112 which in turn will, through the intermediacy of pin 105 and plate 100, maintain the torso in a vertical position.

Referring to Figs. 2 and 3, in which the arm mounting and operation is clearly shown, it will be noted that plate 114, having a serrated face 116, is securely attached to the arm member 92. An opening 118 is formed in the torso into which is securely fitted a flanged sleeve 120. Rotatably mounted in sleeve 120 is a hollow trunnion 122 having an outer serrated face 124, adapted to engage serrations 116 to secure plate 114 to trunnion 122, and provided at its inner end with a squared portion 126. Extending through an opening 128 in plate 114 and engaging the outer surface thereof is a headed pin 130 which passes through hollow trunnion 122 and extends inwardly therebeyond, and is provided adjacent its inner end with a fixed washer 132. To maintain the arm connecting parts in tensioned relation, spring 134 is positioned on pin 130 between trunnion 122 and washer 132 under tension.

Mounted on the squared portion 126 of trunnion 122 is a lever arm 136 to which is pivoted a connecting arm 138.

To operate the arms in proper relation to the movements of the legs, cams 140 and 142 are carried by gear 112 to impart movement to intermediate parts that operate arms 90 and 92 respectively. Securely mounted on pin 105 by suitable means is a member 144 having oppositely disposed trunnions 146 on each of which is pivotally mounted an arm 148. Each arm 148 is provided at its under side with a roller 150 which contacts cam 140 and 142 respectively, and which is so positioned relatively to the arms that as one arm 146 is being raised the other is being lowered and vice versa.

Each arm 148 is provided with a vertical rib 152 having a slot 154 provided with undulations 156 which serve to receive the lower bent portion 158 of connecting arm 138 to hold it in relative fixed position. A spring 160 may be placed above the upper surface of 158 and the top surface of the lot 154 to hold it against accidental movement.

Having thus described the invention, what I claim is:

1. A mechanical figure comprising a torso; arms carried by said torso; a turntable having movable carriages mounted thereon; legs pivotally mounted on said torso with the lower portions thereof secured respectively to said carriages; means for rotating said turntable; means for oscillating said legs, and means actuated by said legs to move said arms relative to said torso.

2. A mechanical figure comprising a turntable; arcuate guides carried by said turntable; a carriage mounted for movement in each of said guides; a torso; legs pivotally mounted on said torso and supported on said carriage; means for rotating said turntable; means for oscillating said legs, and means actuated by said legs to move said arms relative to the torso.

3. A mechanical figure comprising a torso; legs pivotally mounted on said torso; means for oscillating said legs, and means actuated by said legs to maintain said body in an upright position as the legs are oscillated.

4. A mechanical figure comprising arcuate guides having carriages carried thereby; a torso; legs pivotally mounted on said torso with the lower portions thereof secured to carriages respectively, and means to move said carriages in said guides to oscillate said legs in opposite directions.

5. A mechanical figure comprising a turntable having guides carried thereby; carriages movably mounted in said guides; a torso; legs pivotally mounted on said torso with their lower portions secured to their respective carriages; and means for simultaneously rotating said turntable and moving said carriages in said guides.

6. A mechanical figure comprising a turntable having arcuate guides carried thereby; carriages movably mounted in said guides; means for moving said carriages in said guides; a torso; legs pivotally mounted on said torso with the lower portions thereof securely attached to said carriages respectively, whereby when said carriages are moved the legs will be moved relative to said torso.

7. A mechanical figure comprising a turntable having arcuate guides carried thereby; carriages movably mounted in said guides; means for moving said carriages in said guides; a torso; legs pivotally mounted on said torso with the lower portions thereof securely attached to said carriages respectively; and means interposed between said torso and legs to maintain said torso in an upright position.

8. A mechanical figure comprising a torso; legs pivotally mounted on said torso; means for oscillating said legs, and means actuated by said legs to maintain said body in an upright position as the legs are oscillated, said means being adjustable to vary the degree of angularity between said torso and legs.

9. In a mechanical figure of the character described; a hollow torso; a gear member mounted for rotation within said torso, legs pivotally attached to said torso, a segmental gear carried by each of said legs to operatively engage said gear member at opposite sides and to maintain the axis of said gear member in a substantially fixed position as the legs and segmental gear are oscillated.

10. A mechanical figure comprising a turntable having a concave face; guides carried by said turntable below said concave face, a carriage mounted for movement in each of said guides; a torso; legs pivotally mounted on said torso and supported on said carriages, means for rotating said turntable; and means actuated as said turntable is rotated, to oscillate said legs.

11. A mechanical figure comprising a torso; arms pivotaly mounted on said torso;

legs pivotally carried by said torso; means to oscillate said legs, means connecting said legs and arms to oscillate said arms as said legs are oscillated; said last named means being adjustable to vary the relative degree of oscillation of said arms and legs.

In testimony whereof, I hereunto affix my signature.

JAMES G. CONNOR.